UNITED STATES PATENT OFFICE.

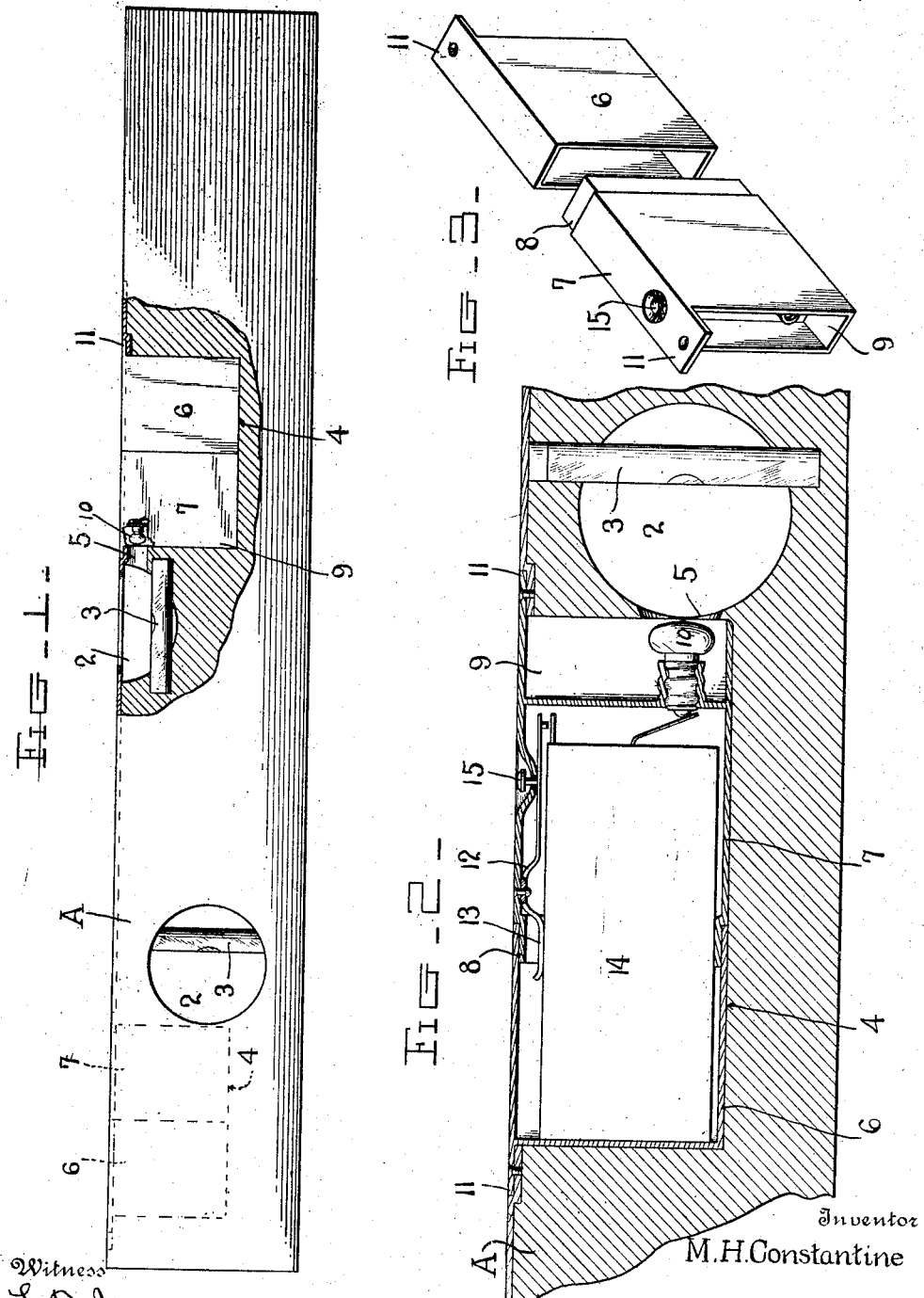

MICHAEL H. CONSTANTINE, OF FRANKLINVILLE, NEW YORK.

LEVEL.

1,294,878.

Specification of Letters Patent.

Patented Feb. 18, 1919.

Application filed June 8, 1918. Serial No. 238,909.

*To all whom it may concern:*

Be it known that I, MICHAEL H. CONSTANTINE, a citizen of the United States, residing at Franklinville, in the county of Cattaraugus and State of New York, have invented new and useful Improvements in Levels, of which the following is a specification.

This invention relates to a level of the electrically illuminated type and more particularly to the case in which the battery is carried that supplies the energy for the lamp employed to illuminate the bubble glass in the level.

The primary object of the invention is to provide a level wherein the battery for supplying energy to the bubble glass lamp is arranged within a case, the construction of which is such, that the battery is not only prevented from becoming affected by climatic condition, but the case may be readily disconnected from the level for the renewal of the battery when the occasion requires.

Another object of the invention is to provide a sectional case of this character wherein one of the case sections is provided with a circuit closer which is so constructed that it may be employed to prevent the shifting of the battery when the level is in use.

With these and other objects in view the invention resides in the novel combination and arrangement of parts which will be hereinafter described and claimed.

In the drawing:—

Figure 1 is a view in side elevation partly in section of a level wherein the electrical energy is supplied to the bubble glass lamp from batteries carried in cases constructed in accordance with the invention.

Fig. 2 is a detailed sectional view upon an enlarged scale through a portion of the level.

Fig. 3 is a perspective view of one of the battery cases, the sections thereof being shown spaced apart.

Like characters of reference denote the corresponding parts throughout the various views in the drawing.

Referring now to the drawing in detail wherein like characters of reference denote the corresponding parts throughout the various views, the letter A designates a spirit level having the usual openings 2 therein through which pass bubble glasses 3. Formed in the level A adjacent each of the openings 2 is a socket 4 between which and the opening adjacent thereto communication is established by means of a passage 5.

Disposed in each of the sockets 4 is a battery case constructed in accordance with the invention and comprising a pair of detachably connected case sections 6 and 7. The case section 7 is provided at one end with a reduced extension 8 which when the case sections are assembled extends within the case section 6 and maintains the case sections in alinement with each other while being disposed within or withdrawn from one of the sockets in the level A. Formed on the opposite end of the case section 7 is a hood 9 in which is arranged a lamp 10 removably mounted in an end wall of the casing section 7. Each of the casing sections is provided with an attaching flange 11 which is provided with a central opening through which may be passed a screw or the like to secure the battery case to the level A.

A strip of resilient conducting material 12 is secured between its ends to a wall of the casing section 7 and is bent upon one side of its point of connection with the casing section to provide an arm 13 which through its engagement with a battery 14 in the casing prevents the shifting of the battery while the level A is in use. Fixed to the strip 12 adjacent its outer end is a button 15 which extends exteriorly of the battery case through an opening in the casing section 7, so that by pressing upon the button 15 an end of the strip 12 may be brought into contact with one of the poles of the battery to establish electrical communication between the battery 14 and the lamp 10.

When it is desired to deënergize the lamp 10 pressure is released from the button 15 to break the contact between the strip 12 and one of the poles of the battery.

From the foregoing description taken in connection with the accompanying drawing it is apparent that an electrically illuminated level has been provided having a battery case which though inexpensive of manufacture is highly efficient for the purposes stated.

Having thus described the invention what is claimed is:—

The combination with a level having a socket therein located to one side of the sight opening and a passage connecting said socket with said opening, said passage being above the bubble glass, a housing in said socket, a hood on said housing communicating with said passage, an electric lamp in said housing adjacent the end of the passage and a battery in said housing connected with the lamp.

In testimony whereof I affix my signature.

MICHAEL H. CONSTANTINE.